Dec. 10, 1929.　　A. MUTSCHELLER　　1,738,917
ELECTRIC MACHINE
Filed Sept. 18, 1923　　2 Sheets-Sheet 1
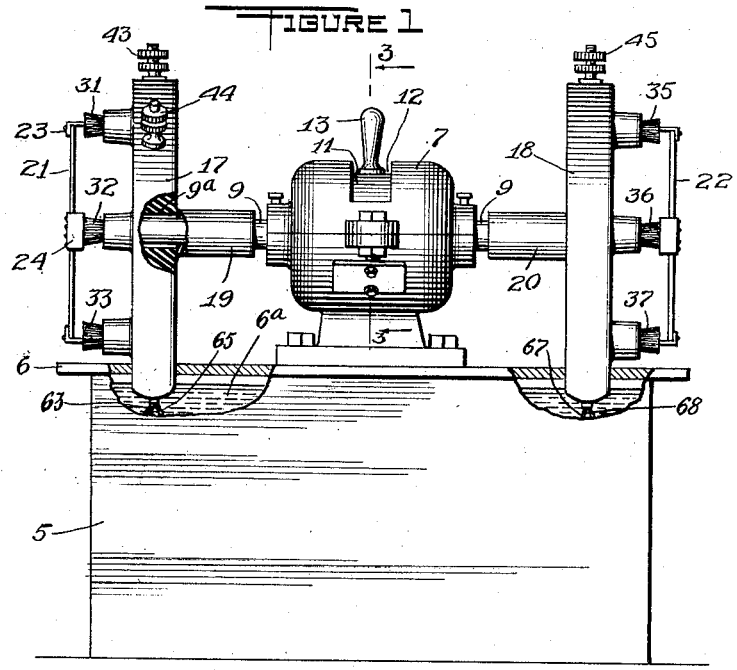
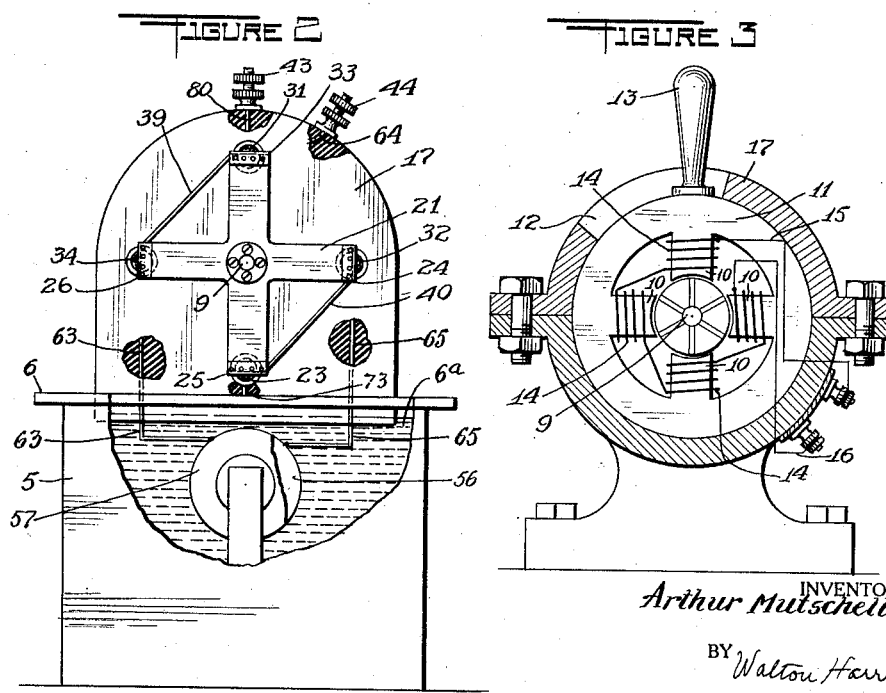
INVENTOR
Arthur Mutscheller
BY Walton Harrison,
ATTORNEY

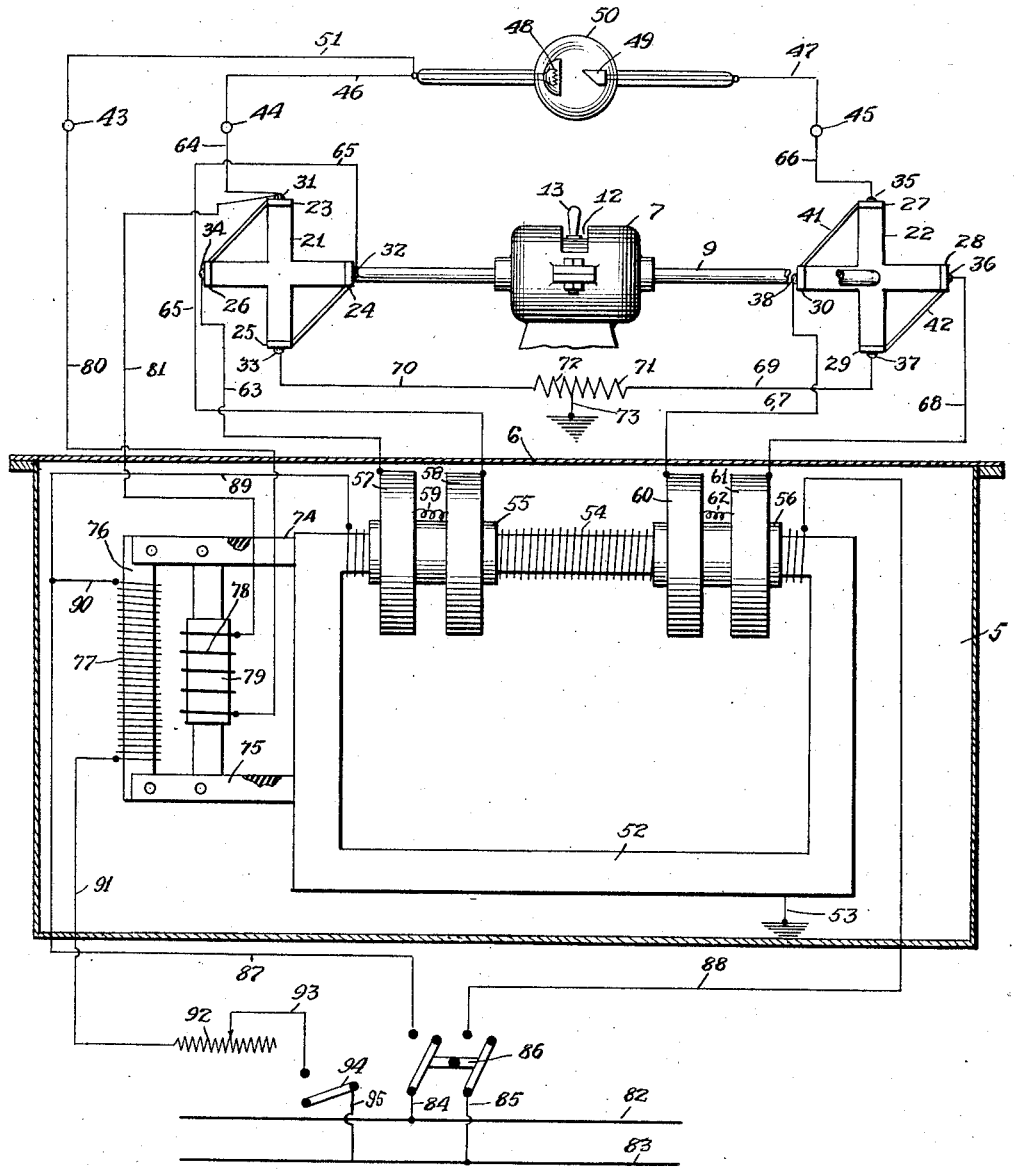

Patented Dec. 10, 1929

1,738,917

UNITED STATES PATENT OFFICE

ARTHUR MUTSCHELLER, OF NEW YORK, N. Y., ASSIGNOR TO WAPPLER ELECTRIC COMPANY, INC., A CORPORATION OF NEW YORK

ELECTRIC MACHINE

Application filed September 18, 1923. Serial No. 663,347.

My invention relates to electric machines of the type in which high tension currents are produced by the use of a transformer, and rectified by means of a rotary rectifying switch in connection with an X-ray tube or the like so as to produce high tension discharges of unitary direction.

More particularly stated I seek to produce an electric machine of the general type just mentioned, and in which I use a high tension transformer mounted within a casing and submerged in oil, in connection with a pair of rectifying switches and a synchronous motor for actuating the same; the switches and motor being mounted directly upon the transformer casing, the switches being energized by high tension leads leading to them from the secondary windings within the casing, these leads being each thoroughly insulated throughout their entire length by being partly submerged in the oil and partly imbedded in massive insulating material; practically all conducting parts from the source of electric power to the X-ray tube being compactly built into a single unit of relatively small size, yet adapted for safely handling currents of different kinds, including those having tension sufficiently high to energize an X-ray tube.

My invention further contemplates, as a part of the unit just mentioned, a synchronous motor provided with a field so arranged that the field magnets may be shifted by hand relatively to the armature and to various stationary parts, and thus adjusted for the purpose of adapting the machine to slight differences in the current phases of the line.

My invention further comprehends various improvements in construction, and various combination of parts, for the purpose of improving the general efficiency of the electric machine as a whole.

Reference is made to the accompanying drawing forming a part of this specification, and in which like reference characters indicate like parts throughout the several figures.

Figure 1 is a side elevation of my improved electric machine.

Figure 2 is an end elevation, and shows the machine appearing in Figure 1, but as it would be seen by an observer standing at the left thereof according to Figure 1.

Figure 3 is a fragmentary section on the line 3—3 of Figure 1, looking in the direction indicated by the arrows.

Figure 4 is a diagram of the wiring and the various electrical connections.

A casing 5, having the general form of an oblong box, serves a number of different purposes. It serves as a receptacle for holding a number of parts, and as a tank for holding oil, for insulating said parts. It also serves as the framework of my machine, and as a base for the motor and the rectifying switches.

The casing 5 is provided with a top board 6, which is used as a cover therefor.

Mounted upon the board 6 and thus supported upon the casing 5 is a synchronous motor 7, provided with a revoluble armature mounted upon a shaft 9. The motor 7 is further provided with a number of field magnets 10, carried by a field ring 11, which is revolubly fitted within the casing of the motor 7, as may be understood from Figure 3.

The casing of the motor is provided with a slot 12, and extending radially outward through this slot is a handle 13, mounted rigidly upon the field ring 11.

The operator, by grasping the handle 13 and moving it within the limits permitted by the length of the radial slot 12, can shift the field ring 11 and by so doing can shift the field magnets 10.

The field magnets 10 are provided with field windings 14, and the latter are energized through the medium of a pair of conductors 15 and 16.

Mounted upon the casing 5 and extending upwardly therefrom are a pair of stanchions 17 and 18, each rather massive and each having an upwardly extending edge of substantially semi-cylindrical form. These stanchions are each made of insulating material, and the shaft 9 extends through holes in them, one of these holes appearing at 9ª, in Figure 1.

The stanchion 17 is provided with a neck 19 of substantially cylindrical form, indicated adjacent the hole 9ª, and the stanchion 18 is provided with a similar neck 20. The armature shaft 9 extends through the necks 19 and 20, and is supported out of engagement with the stanchions.

Secured rigidly upon the ends of the shaft 9 and revoluble therewith are a pair of spiders 21 and 22, made of micanite, fiber or other appropriate insulating material, and serving the purpose of rectifying disks. The spider 21 carries four contact sectors 23, 24, 25, 26 and the spider 22 similarly carries four contact members 27, 28, 29 and 30.

The stanchion 17 supports four brushes 31, 32, 33 and 34, and the stanchion 18 also carries four brushes 35, 36, 37 and 38. A connector 39 extends from the contact sector 23 to the contact sector 26, and a connector 40 extends from the sector 24 to the sector 25.

In the same manner a connector 41 extends from the sector 27 to the sector 30 and a connector 42 extends from the sector 28 to the sector 29.

Binding posts 43, 44, 45 mounted upon the stanchions 17 and 18, serve as high tension terminals.

Connected with the binding post 44 is a conductor 46, leading to the cathode 48, and connected with the binding post 45 is a conductor 47 leading to the anode 49, of an X-ray tube 50, shown in Figure 4, but not appearing in the other figures.

The cathode 48 and the anode 49 are the high tension electrodes of the X-ray tube.

A conductor 51 is detachably connected with the binding post 43, and leads therefrom to the cathode 48. This cathode is a filament, adapted to be heated in order to produce a pure electron discharge. Thus the conductors 46, 47 and 51 are transient connections, used from time to time with the X-ray tube.

Located within the casing 5 is a closed transformer core 52, and this core is provided with a connection 53 whereby it is grounded through the casing. Mounted upon the transformer core 52 is a primary winding 54, and encircling this primary winding are two sleeves 55 and 56 of insulating material.

Mounted upon the sleeve 55 are two secondary windings 57, 58, connected together by a wire 59.

A conductor 63 extends from the secondary winding 57 to the brush 34, and a conductor 64 extends from the brush 31 to the binding post 44.

The parts just described constitute the main transformer; that is, the step-up transformer for producing the discharge through the X-ray tube.

A conductor 65 extends from the brush 32 to the secondary winding 58. A conductor 66 leads from the binding post 45 to the brush 35.

A conductor 67 extends from the brush 38 to the secondary winding 60. A conductor 68 extends from the brush 36 to the secondary winding 61. A conductor 69 is connected with the brush 37, and a wire 70 is connected with a brush 33. These conductors 69 and 70 are connected with resistances 71 and 72, and by means of a connection 73 these resistances are grounded through the casing.

Mounted upon the transformer core 52 and extending therefrom are two bars 74 and 75 of insulating material such as fiber, hard rubber, porcelain or the like. Mounted upon these bars 74 and 75 is a small transformer 76 of the closed-core type. This transformer is a step-down transformer; being provided with a primary winding 77 made of a good many turns of small wire and having a rather high resistance, and with a secondary winding 78 of a few turns of coarser wire having a resistance somewhat lower than that of the primary winding 77. The secondary winding 78 is insulated by means of a sleeve 79 of suitable insulating material. A conductor 80 is connected with the secondary winding 78, and extends therefrom to the binding post 43. A conductor 81 is also connected with the primary winding 78, and extends from the same to the brush 31.

The transformer 76 is an auxiliary transformer, used for the purpose of supplying currents to heat the cathode 48, as hereinafter more fully described.

A pair of power mains is shown at 82 and 83, and connected with these mains are two conductors 84 and 85, leading therefrom to a double switch 86. Connected with this switch are two conductors 87 and 88. The conductor 88 leads to one end of the primary winding 54. The conductor 87 is connected with the conductor 89, leading to the end of the primary winding 54, opposite the end thereof, with which the conductor 88 is connected. The conductors 87 and 89, at their junction, are connected with a conductor 90, leading to one end of the primary winding 77. Another conductor 91 is connected with the other end of the primary winding, and leads therefrom to a variable resistance 92, used as a current regulator. A conductor 93 is connected with the variable resistance 92, and with a switch 94. A conductor 95 leads from this switch to the main 83.

The two stanchions 17 and 18, which as above described are each of massive construction and made of insulating material, are so made and arranged that various conductors are imbedded within the material of the stanchions. The conductor 80, leading to the binding post 43, is imbedded within the stanchion 17 and extends vertically through the same throughout the entire height thereof. The conductor 64, extending from the brush 31 to the binding post 44, is in its entirety thus imbedded; and the respective conductors 81, 65, 70 and 63, leading downwardly from the brushes 31, 32, 33 and 34 into the casing 5, are imbedded within the material of the stanchion as far downwardly as the top of the casing.

Similarly the conductor 66, leading from the binding post 45 to the brush 35, is throughout its entire length imbedded within the material of the stanchion 18, and the various conductors 67, 68, 69, leading downwardly from the brushes 38, 36 and 37 are also thus imbedded.

The transformer casing 5 is filled with oil 6ª, and the stanchions 17 and 18 each extend down through the board 6 and into this oil. In order to prevent the possibility of air bubbles settling or forming upon the lower ends of the stanchions, these ends are rounded, as indicated in Figure 1.

It is very desirable that the insulation for the conductors 65, 66, 67 and 68 be continuous. That is to say, each of these conductors is insulated for a part of its length by being submerged in the oil; and for another part of its length by being imbedded within the massive insulating material of which the stanchions are made, but each of the conductors is insulated thoroughly throughout its entire length. For this purpose the lower ends of the stanchions are brought down below the surface of the oil, so that each conductor, at the point where it extends downwardly from the bottom of the stanchion in which it is imbedded is completely submerged within the oil.

With the parts thus constructed and co-related, the insulation for the several conductors 63 and 65, 67 and 68 can easily be rendered greater than the insulation afforded by the air as between any two successive brushes of the rectifying switch. In other words, the insulation of the conductors 63, 65, 67 and 68, can be rendered good enough to withstand a difference of potential fully as great as the highest potential under which the rectifying switches can possibly work without discharges taking place from brush to brush, through air.

By this arrangement excellent insulation is provided for the various conductors mentioned, and these conductors are thus effectively prevented from projecting outwardly from the exposed surfaces of the stanchions. Moreover the conductors thus arranged are concealed, and the mechanism as a whole is to all practical intents and purposes greatly simplified in consequence.

The double switch 86 is for the purpose of controlling the main transformer, and thus is used for starting and stopping the main discharge to the X-ray tube.

The switch 94 is for the purpose of throwing the transformer 76 into and out of action, and thereby controlling the currents used for heating the cathode of the X-ray tube.

The variable resistance 92 is closely associated with the switch 94, and is for the purpose of regulating the relatively weak currents used for energizing the cathode, or in other words is used for controlling the heat of the cathode filament.

The operator by moving the handle 13 back and forth within the slot 12 and thereby shifting the position of the field ring 11 and the field magnets carried thereby, can correct or change slightly the phase of the synchronous motor 7. He does this in order to maintain the motor in proper synchronism with the line currents, in such manner as to avoid sparking between the various contact sectors and the brushes associated therewith in the rectifying switches. Experience shows that when there is a tendency toward undue sparking between the contact sectors and the brushes as just mentioned, this tendency can usually be corrected within certain limits by shifting the position of the field magnets by means of the handle 13, as above described.

The rotation of the shaft 9 and parts carried thereby is in a clockwise direction according to Figure 4.

The operation of my device is as follows:

The various parts being formed and arranged as above described, and the switches 86 and 94 being closed, the transformers are of course in action, and the X-ray tube is energized.

The main discharge through the X-ray tube is produced by high tension currents developed in the secondary windings 57 and 58, 60 and 61; that is, by the main transformer.

The cathode 48 is heated by currents from the secondary winding 78 of the auxiliary transformer, usually designated in practice as the heating transformer.

A circuit through the primary winding of the main transformer may be traced as follows: Main 82, conductor 84, left hand member of double switch 86, conductors 87 and 89, primary winding 54, conductor 88, right hand member of double switch 86, conductor 85, main 83 to source of power (not shown), and thence back to main 82.

A secondary circuit through the X-ray tube may be traced as follows: secondary winding 57, conductor 63, brush 34, sector 26, connector 39, sector 23, brush 31, conductor 64, binding post 44, conductor 46, cathode 48 and anode 49 of X-ray tube 50, conductor 47, binding post 45, conductor 66, brush 35, sector 27, connector 41, sector 30, brush 38, conductor 67, secondary winding 60, wire 62, secondary winding 61, conductor 68, brush 36, sector 28, connector 42, sector 29, brush 37, conductor 69, resistances 71 and 72 (grounded at 73), conductor 70, brush 33, sector 25, connector 40, sector 24, brush 32, conductor 65, secondary winding 58, and wire 59 back to secondary winding 57.

When the rotation of the shaft 9, in a clockwise direction according to Fig. 4, carries the spiders 21 and 22 each into its next successive operative position so that the direction of the currents induced in the secondary winding is reversed by the action of the main transformer, another secondary circuit may be traced, as follows: secondary winding 57, conductor 63, brush 34, contact sector 25, (spider now in a new position), connector 40, sector 24, brush 33, conductor 70, resistances 72 and 71 (grounded at 73), conductor 69, brush 37, sector 28, connector 42, (new position of spider 22), sector 29, brush 38, conductor 67, secondary winding 60, wire 62, secondary winding 61, conductor 68, brush 36, sector 27, (new position) connector 41, sector 30, brush 35, conductor 66, binding post 45, conductor 47, anode 49 of X-ray tube, cathode 48, conductor 46, binding post 44, conductor 64, brush 31, contact sector 26, connector 39, sector 23, brush 32, conductor 65, secondary winding 58, and wire 59, back to secondary winding 57.

Considerable advantage arises from the manner in which the main secondary windings 57 and 58, 60 and 61 are mounted. By arranging the windings in pairs, as shown, each pair being carried upon one of the sleeves 55 or 56 of insulating material, the potential strains are well distributed and considerable convenience is attained. With the main secondary windings thus arranged, it is possible to obtain exceedingly high voltages with a machine of relatively small size: and by mounting the auxiliary transformer 76 upon the core 52 of the main transformer, is practicable to obtain all of the known advantages of a pure electron discharge within the X-ray tube, without the necessity for making the apparatus as a whole very much larger than would otherwise be required.

I call attention to the fact that my machine, though well adapted for producing and maintaining discharges of very high electrical tension, comprises a relatively small number of parts, and that the machine in its entirety is very compact.

I call further attention to the fact that very few parts serving as conductors or capable of acting as such are left protruding from any part or parts of the machine. The result is that the apparatus as a whole is about as free from danger, either to the operator or such other persons as may handle it or come near it while it is in action, as could well be expected. The parts serving as conductors and left protruding are such parts as must of necessity be readily accessible. All other parts capable of delivering high tension discharges, accidentally or otherwise, are either confined within the casing or else imbedded in one or both of the massive stanchions of insulating material.

It will also be noted that each rectifying switch, as a unit, is connected with a pair of the main secondary windings, the two windings of each pair being spaced apart and occupying one or the other of the two sleeves 55 and 56 of insulating material. Thus each sleeve 55 or 56, carrying a pair of main secondary windings, is connected directly with one or the other of the two rectifying switches.

This arrangement tends to simplify the mechanism, and also to some extent to group together such parts as are closely related in function. That is, each of the rectifying switches is disposed in close relation to and in direct metallic communication with the particular pair of main secondary windings from which it is supplied directly with high tension currents.

I do not limit myself to the precise mechanism shown and described, as variations may be made therein, without departing from my invention, the scope of which is commensurate with my claims:

I claim:

1. An electric machine of the character described, comprising a supporting board, an electric motor mounted centrally upon said supporting board, said electric motor being provided with a revoluble shaft extending through said motor and protruding therefrom in two directions, a pair of stanchions made of insulating material and mounted upon said board, a pair of revoluble spiders mounted upon the ends of said revoluble shaft and actuated by the rotation of the shaft, said spiders being made of insulating material, contact sectors carried by said spiders, connectors carried by said spiders and connected with said contact sectors, contact brushes mounted upon said stanchions and disposed adjacent the paths of travel of said contact sectors in order to supply thereto electric currents to be rectified, and conductors connected with said brushes and imbedded in said stanchions.

2. An electric machine of the character described comprising a casing having a general form of an oblong box, a top board mounted upon said casing and serving as a closure for said box and also as a supporting member, a synchronous motor mounted upon said top board and provided with a revoluble shaft extending from said motor in two directions, a pair of stanchions located adjacent the ends of said shaft and made of insulating material, said stanchions being provided with bearings of substantially cylindrical form through which said shaft extends, a pair of rectifying switches connected with the ends of said shaft and driven by rotation of the shaft, said rectifying switches being supported partly by said stanchions, and conductors adapted to connect with said revoluble switches for the purpose of supplying thereto the currents to be rectified, said conductors being imbedded within the insulating material of said stanchions.

3. An electric machine of the character described comprising a casing having a general form of a box, a top board mounted upon said casing and serving as a closure member for said box and as a supporting member for other parts, a synchronous motor mounted upon said top board and provided with a revoluble shaft extending through said motor so as to project in two directions, a pair of stanchions located adjacent the ends of said shaft, said stanchions being mounted upon said top board and located upon opposite sides of said motor, a pair of rectifying switches partly supported by said stanchions, said rectifying switches being connected with the ends of said shaft and driven by the rotation of the shaft, a transformer mounted within said box, conductors extending from said transformer to said rectifying switches for the purpose of supplying to said switches the currents to be rectified thereby, and means for synchronously energizing said motor and said transformer.

4. An electric machine of the character described comprising a casing, a top board mounted upon said casing and serving the double purpose of a closure for said casing and a supporting member for other parts, a synchronous motor mounted upon said top board, a plurality of massive stanchions mounted upon said top board and each made of insulating material, a plurality of rectifying switches supported partly by said stanchions and connected with said motor in order to be driven thereby, a transformer mounted within said casing and provided with a number of secondary windings arranged in pairs, conductors extending from each of said rectifying switches to a pair of said secondary windings, said conductors being imbedded within the material of said stanchions and thereby concealed, and means for energizing said synchronous motor and said transformer.

5. An electric machine of the character described comprising a casing, a main transformer mounted therein, an auxiliary transformer mounted upon said main transformer and thus housed within said casing, a top board mounted upon said casing and serving as a closure member for the casing and as a supporting member for other parts, a synchronous motor mounted upon said top board, a plurality of stanchions mounted upon said top board and spaced apart, each of said stanchions being of massive construction and made of insulating material, rectifying switches supported in part by said stanchions and connected with said motor in order to be driven thereby, conductors extending from said rectifying switches to said main transformer, said conductors being imbedded within the material of said stanchions, and means for synchronously energizing said main transformer and said motor.

6. In an electric machine the combination of a prime mover provided with a revoluble shaft extending from it in opposite directions, a pair of mechanical rectifiers connected with said shaft and driven by the rotation thereof, said mechanical rectifiers being located upon opposite sides of said prime mover, a single transformer case serving as a support for said prime mover and parts carried thereby, a high-tension transformer located in said transformer case, conductors extending from said transformer to said mechanical rectifiers, and a plurality of insulators carried by said transformer casing and through which said conductors extend, said insulators extending toward said mechanical rectifiers.

7. In an electric machine the combination of a prime mover provided with a revoluble shaft extending from it in opposite directions, a pair of mechanical rectifiers connected with said shaft and driven by the rotation thereof, said mechanical rectifiers being located upon opposite sides of said prime mover, a single transformer case serving as a support for said prime mover and parts carried thereby, high-tension transformer mechanism located in said transformer case, conductors extending from said transformer mechanism to said mechanical rectifiers, said conductors being located upon opposite sides of said prime mover, and a plurality of insulators through which said conductors extend, said insulators being mounted upon said transformer case and located upon opposite sides of said prime mover so as to extend therefrom toward said mechanical rectifiers.

8. An electric machine of the character described, comprising a supporting board, an electric motor mounted upon said supporting board and provided with a revoluble shaft extending from said motor in two directions, a pair of stanchions made of insulating material and extending through said supporting board, said stanchions being disposed upon opposite sides of said motor and located adjacent the ends of said shaft, a pair of rectifying switches located upon opposite sides of said motor and connected with said stanchions, said rectifying switches being also connected with the ends of said shaft so as to enable said shaft to actuate said rectifying switches, and conductors connected with said rectifying switches.

9. An electric machine of the character described, comprising a supporting board, a synchronous motor mounted upon said supporting board and carrying a revoluble shaft extending from said motor in two directions, a pair of stanchions extending through said supporting board and located in opposite directions from said motor, each stanchion being made of insulating material and provided with an opening through which said shaft extends, and a pair of rectifying switches located in opposite directions from said motor, said rectifying switches being connected with said stanchions and partly supported thereby, and also connected with said revoluble shaft and actuated by the rotation thereof.

10. An electric machine of the character described comprising a casing having the general form of a box, a top board mounted upon said casing and serving as a closure member for said box and as a supporting member for other parts, a synchronous motor mounted upon said top board and substantially midway between the ends thereof, said motor being provided with a revoluble shaft extending through said motor and extending in opposite directions therefrom, a pair of stanchions made of insulating material and located upon opposite sides of said motor and supported by said top board, said stanchions extending entirely through said top board and being provided with openings through which the end portions of said revoluble shaft extends, a pair of rectifying switches connected with the ends of said shaft and driven by the rotation of the shaft, said rectifying switches being partly supported by said stanchions and located upon opposite sides of said motor, a transformer mounted within said box, conductors extending from said transformer through said stanchions to said rectifying switches for the purpose of supplying to said switches the currents to be rectified thereby, and means for synchronously energizing said motor and said transformer.

11. An electric machine of the character described comprising a support, a synchronous motor mounted upon said support and provided with a revoluble shaft extending in opposite directions from said motor, a plurality of insulating members carried by said support, a pair of rectifying switches connected with the ends of said shaft and driven thereby, said rectifying switches being supported partly by the ends of said shaft and partly by said insulating members, and conductors extending through said insulators to said rectifying switches.

12. An electric machine of the character described comprising a casing, a high tension transformer mounted within said casing, a volume of oil contained within said casing and covering said transformer, a synchronous motor mounted upon said casing and provided with a revoluble shaft, a plurality of insulators carried by said casing and extending upwardly from points below the upper level of said volume of oil, a pair of rectifying switches connected with the ends of said shaft and driven thereby, said rectifying switches being supported partly by the ends of said shaft and partly independent of said shaft, and conductors extending from said high tension transformer and through said insulators to said rectifying switches.

13. An electric machine of the character described comprising a support, a synchronous motor mounted upon said support and provided with a revoluble shaft extending in opposite directions from the motor, revoluble spiders carried by said shaft and spaced apart, supporting members of insulating material carried by said support, stationary sectors carried by said supporting members and coacting with said revoluble spiders for rectifying high tension currents, and conductors leading through said supporting members of insulating material to said stationary sectors.

14. An electric machine of the character described comprising a casing, a high tension transformer mounted within said casing, a volume of oil contained within said casing and covering said transformer, a synchronous motor mounted upon said casing and provided with a revoluble shaft, a plurality of insulators carried by said casing and extending upwardly from points below the upper level of said volume of oil, a pair of rectifying switches connected with the ends of said shaft and driven thereby, and conductors extending from said high tension transformer and through said insulators to said rectifying switches.

15. In an electric machine the combination of a support, a synchronous motor mounted upon said support and provided with a revoluble shaft extending in opposite directions from said motor, a plurality of supporting members made of insulating material and mounted upon said support, said supporting members being disposed upon opposite sides of said synchronous motor, stationary sectors carried by said supporting members, spiders carried by the ends of said shaft and coacting with said stationary sectors for the purpose of rectifying high tension currents, and conductors extending through said supporting members to said stationary sectors.

16. In an electric machine the combination of a support extending horizontally, a synchronous motor mounted upon said support and provided with a revoluble shaft extending substantially parallel with the top thereof, a plurality of supporting members carried by said support and extending upwardly therefrom, said supporting members being made of insulating material and provided with portions disposed adjacent said shaft, revoluble spiders carried by said revoluble shaft and spaced apart, stationary sectors mounted upon said supporting members and coacting with said revoluble spiders for rectifying high tension currents, and conductors extending through said supporting members to said stationary sectors.

17. In an electric machine the combination of a support, a synchronous motor supported by said support and provided with a revoluble shaft extending in opposite directions from said motor, a plurality of supporting members mounted upon said support and extending therefrom, said supporting members being made of insulating material and disposed adjacent the ends of said shaft, and high tension rectifying switches connected with the ends of said shaft and driven thereby, said rectifying switches being supported partly by the ends of said shaft and partly by said supporting members, and conductors extending through said supporting members to said rectifying switches.

Signed at New York city, in the county of New York and State of New York, this 15th day of September, 1923.

ARTHUR MUTSCHELLER.